(12) United States Patent
Pradip et al.

(10) Patent No.: US 7,713,527 B2
(45) Date of Patent: May 11, 2010

(54) SPECIFIC AVIAN EGG ANTIBODIES FOR DISEASE PREVENTION AND IMPROVEMENT OF GROWTH PERFORMANCE

(76) Inventors: Maiti Pradip, 6-62 Scurdielf Blvd., Winnipeg Manitoba (CA) R3Y 1M5; John Hare, 6-62 Scurfield Blvd, Winnipeg Manitoba (CA) R3Y 1M5

( * ) Notice: Subject to any disclaimer, the term of this patent is extended or adjusted under 35 U.S.C. 154(b) by 0 days.

(21) Appl. No.: 11/532,696

(22) Filed: Sep. 18, 2006

(65) Prior Publication Data

US 2007/0071795 A1    Mar. 29, 2007

(51) Int. Cl.
*A61K 39/00* (2006.01)
(52) U.S. Cl. ............ 424/157.1; 424/150.1; 424/164.1; 424/169.1; 424/803; 424/804; 530/388.4; 530/389.5
(58) Field of Classification Search ........................ None
See application file for complete search history.

(56) References Cited

U.S. PATENT DOCUMENTS

| 4,748,018 | A | * | 5/1988 | Stolle et al. | 424/157.1 |
| 5,080,895 | A | * | 1/1992 | Tokoro | 424/157.1 |
| 5,919,451 | A | * | 7/1999 | Cook et al. | 424/130.1 |
| 5,976,580 | A | * | 11/1999 | Ivey et al. | 426/2 |
| 2007/0231320 | A1 | * | 10/2007 | Cook et al. | 424/133.1 |

OTHER PUBLICATIONS

Shipp et al., Feed Mix, 1999, vol. 7, pp. 30, 32-33.*
Jin et al., FEMS Immunology and Medical Microbiology, 1998, 21:313-321.*
Yokoyama et al., Infect Immun. Mar. 1992;60(3):998-1007.*

* cited by examiner

*Primary Examiner*—Michael Szperka
(74) *Attorney, Agent, or Firm*—Michael R. Williams; Ade & Company Inc.

(57) ABSTRACT

Piglet feed is supplemented with anti-*E. coli* K88 antibody-containing egg powder having a titer of the K88 antibodies of at least 1/256,000 as a means of improving growth performance of piglets.

6 Claims, 9 Drawing Sheets

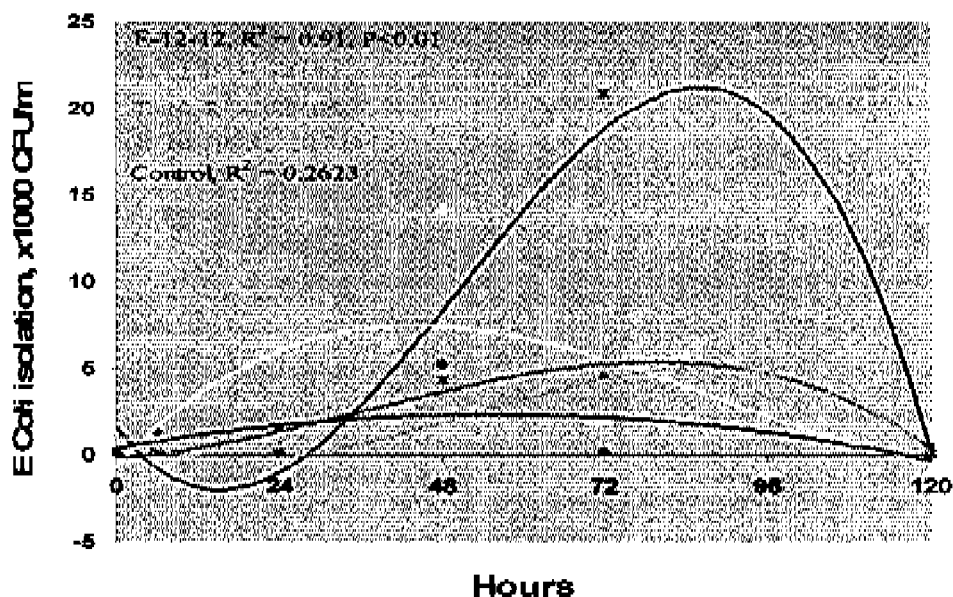
Figure 7. Fecal E coli isolation vs. hours post-infection
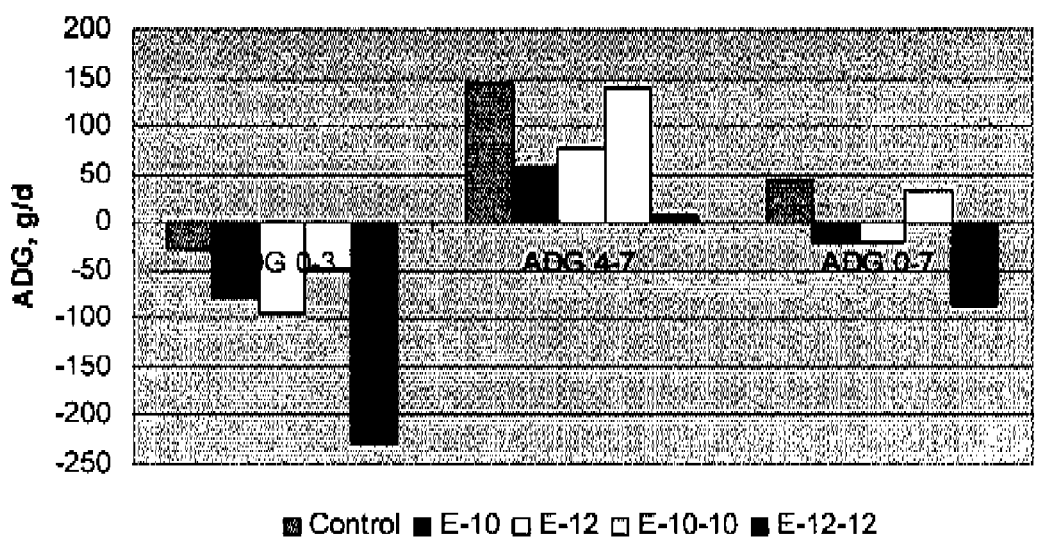
Figure 8. E coli Challenge on Phase 1 ADG of Pigs

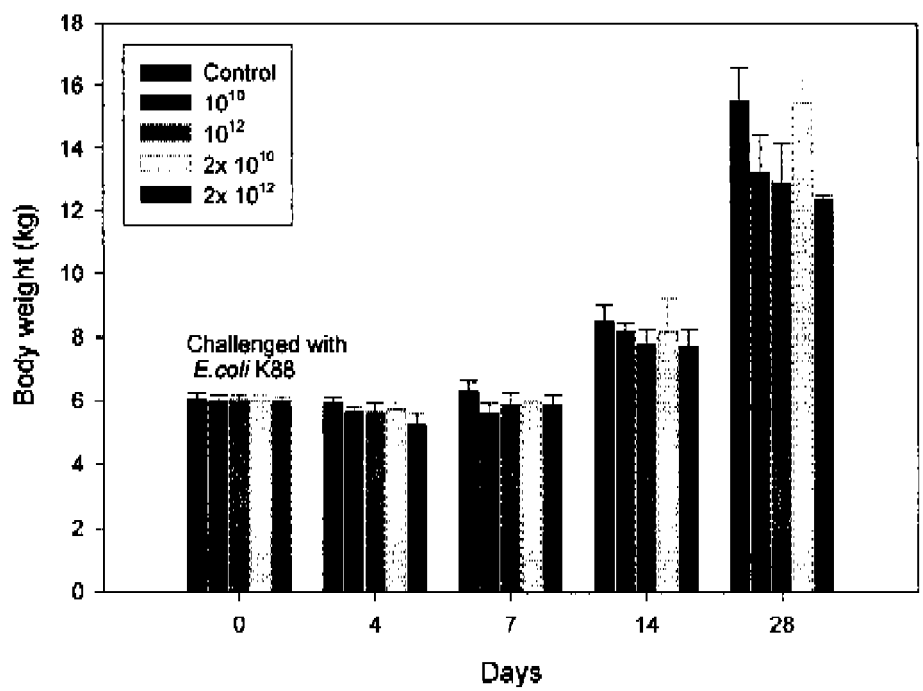
Figure 9: Body weight changes during the study period
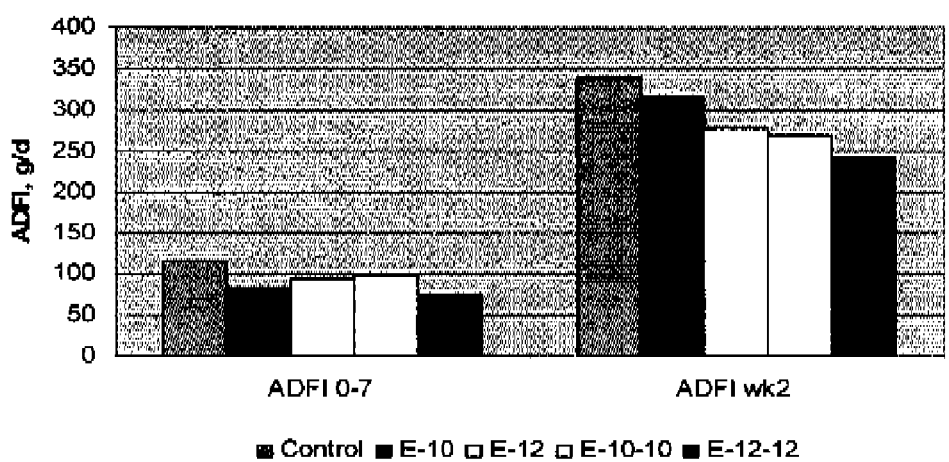
Figure 10. E coli Challenge on Phase 1 Feed Disappearance of Pigs

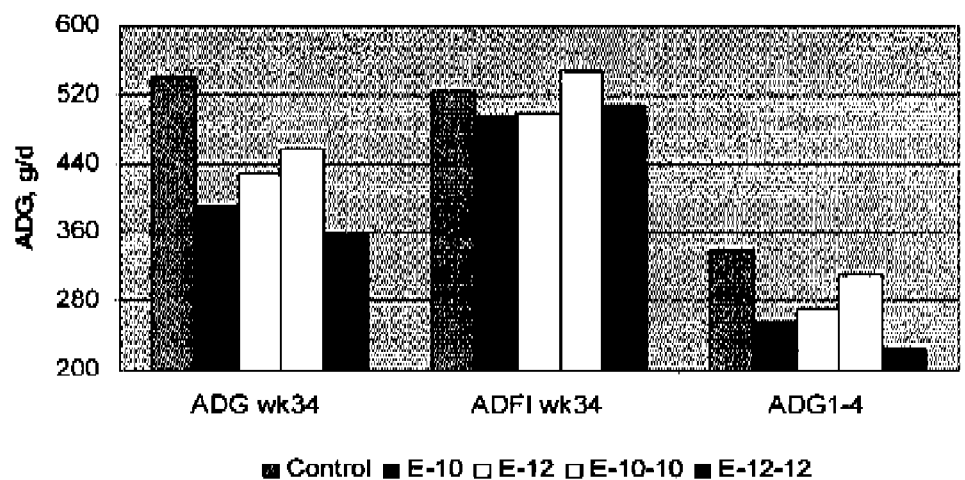
Figure 11. E coli Challenge on Phase 2 and Overall Performance of Pigs
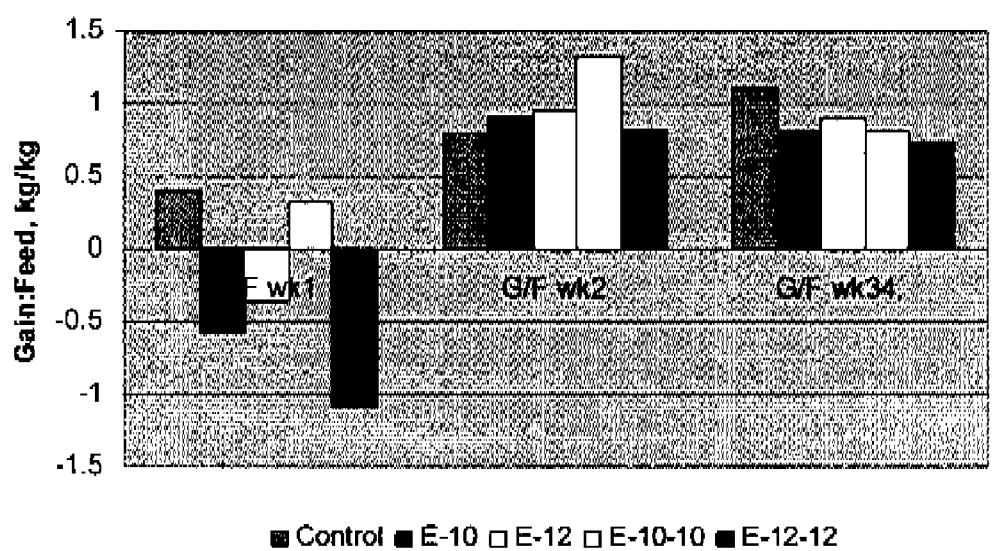
Figure 12. E coli Challenge on Feed Efficiency of Pigs

** = p<0.01

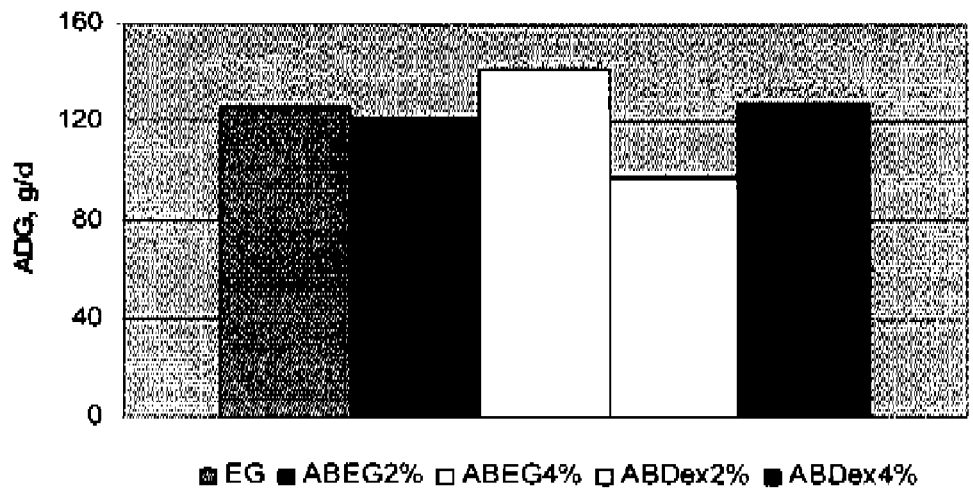
Figure 14. Dietary Effect on Wk1 ADG of Pigs
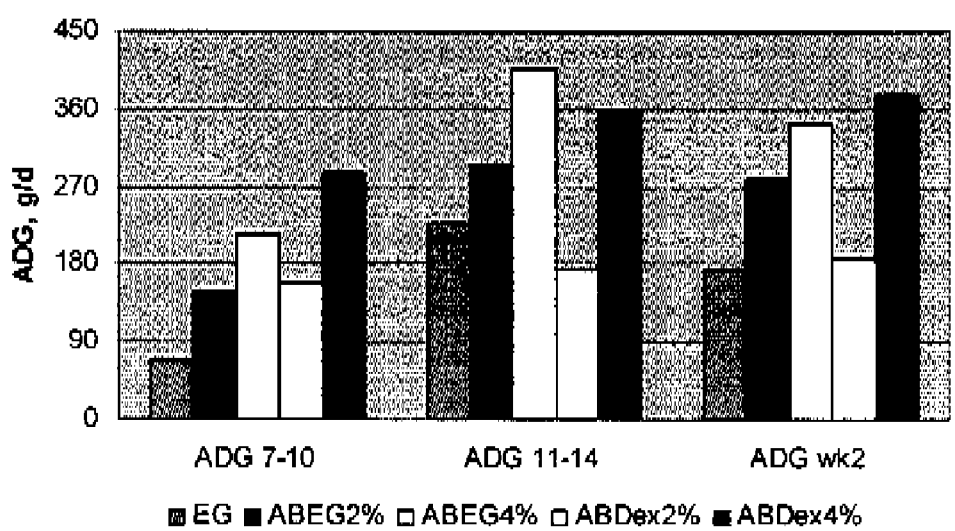
Figure 15. Dietary Effect on Wk 2 ADG of ETEC Challenged Pigs

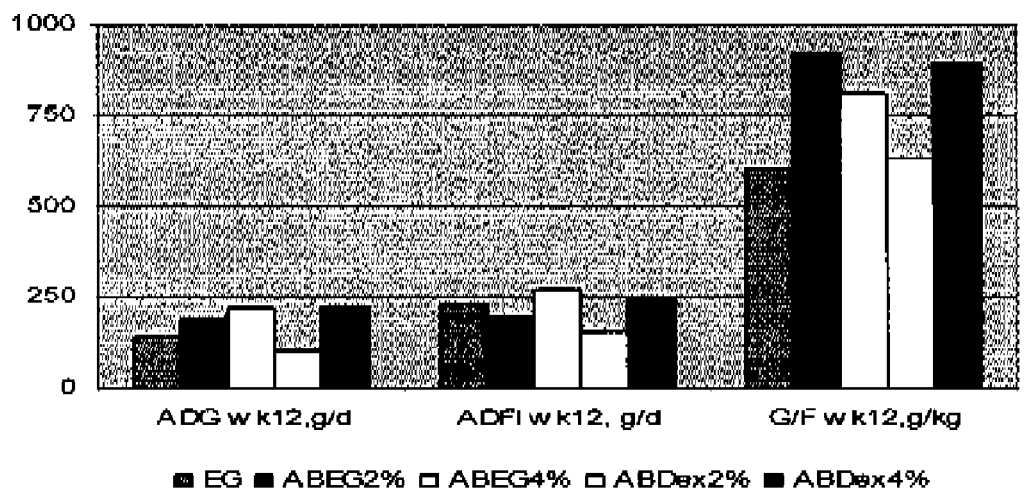
Figure 16. Dietary Effects on Wk 1 to 2 ADG of Pigs
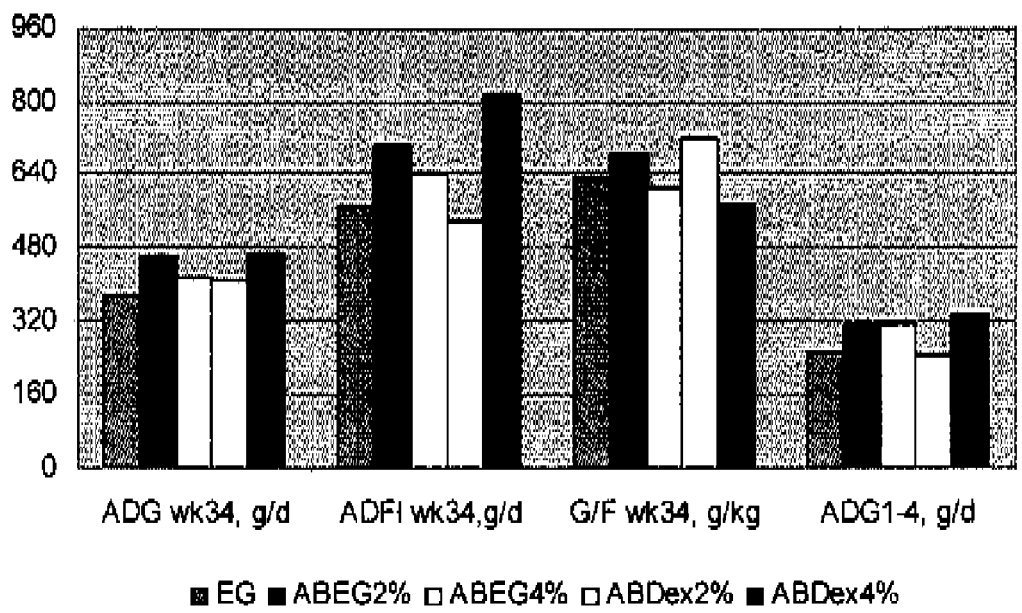
Figure 17. Dietary Effects on Pig Performance During Wk 3 to 4

SPECIFIC AVIAN EGG ANTIBODIES FOR DISEASE PREVENTION AND IMPROVEMENT OF GROWTH PERFORMANCE

PRIOR APPLICATION INFORMATION

This application claims the benefit of Canadian Patent Application 2,521,156, filed Sep. 16, 2005.

BACKGROUND OF THE INVENTION

It is believed that feed additives which improve gut health and provide a more balanced gut microflora will promote growth of an animal.

In recent years, passive immunotherapy by oral administration of specific antibodies against gastrointestinal pathogens has been studied extensively in animals. Furthermore, there has been increasing interest in developing avian polyclonal antibodies for treatment of gastrointestinal diseases caused by various pathogens. As orally administered antibodies would provide the advantage of reduced cost and ease of administration for the treatment of enteric diseases, as an alternative to antibiotics. The aim of efficient pork production is to maximize lean meat yield while minimizing production cost. It has been established that two important factors contributing to lean growth are improving health status and the prevention of specific diseases. Enterotoxigenic $E.\ coli$ (ETEC) strains that express K-88 fimbriae are a major cause of diarrhea and death in neonatal and newly weaned pigs resulting in major economic loss to the pork industry. It has been estimated that K-88-mediated ETEC are responsible for 50% of the 10 million baby pig deaths each year. Historically, antibiotics and animal plasma proteins have helped to reduce the detrimental effects of this condition. However, there is mounting pressure to discontinue the use of antibiotics and animal plasma proteins in swine industry, due to the concerns of human health. Many antibiotics and plasma proteins are banned for use in swine diets in Europe and will most likely be restricted in North America. Therefore, researchers have taken keen interest in searching for alternative therapies to antibiotics that could be used in swine nutrition, particularly during the nursery phases. Passive immunotherapy has been shown to have prophylactic and therapeutic benefits for controlling disease and improving livestock growth performance. Avian (egg) antibodies developed against ETEC can be transferred to the recipient by oral administration through supplementation of the normal diet of post-weaning piglets, thereby preventing the ETEC disease in piglets and acting as an effective growth promoter. Orally administered antibodies provide the advantage of reduced cost and ease of administration for the treatment of enteric disease as well as for improvement of gut health, the key requirement for the improved growth performance, offering effective and sustainable replacements for both plasma proteins and antibiotics

SUMMARY OF THE INVENTION

According to a first aspect of the invention, there is provided a method of increased growth in an animal comprising:

immunizing a population of hens with at least one bacterial antigen;

collecting eggs from the population of hens, said eggs containing antibodies raised against said at least one bacterial antigen;

recovering antibody-containing material from said eggs;

drying said antibody-containing material to a powder, thereby producing dried egg powder; and supplementing feed of an animal with 0.1-1.0% (w/w) of the dried egg powder, wherein said animal has increased growth compared to a control animal fed unsupplemented feed.

BRIEF DESCRIPTION OF THE DRAWINGS AND TABLES

FIG. 1: bar graph of weight over time in groups fed control feed, feed+0.1% SDEP and feed+0.4% SDEP.

FIG. 2: bar graph of weight over time in groups fed antibiotics and control feed, feed+0.1% SDEP and feed+0.4% SDEP.

FIG. 7 shows fecal $E.\ coli$ isolation versus hours post infection.

FIG. 8 is a bar graph showing $E.\ coli$ challenge on phase 1 ADG of pigs.

FIG. 9 is a bar graph of body weight changes during the study period.

FIG. 10 is a bar graph showing the effect of $E.\ coli$ challenge on phase 1 feed disappearance of pigs.

FIG. 11 is a bar graph showing the effect of $E.\ coli$ challenge on phase 2 and overall performance of pigs.

FIG. 12 is a bar graph showing the effect of $E.\ coli$ challenge on feed efficiency of pigs.

Figure 1:
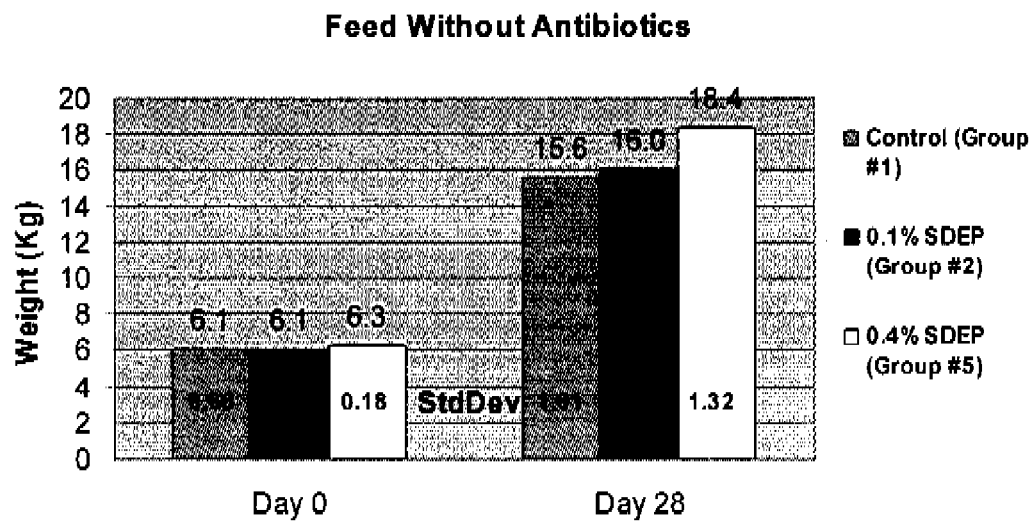
Figure 2:
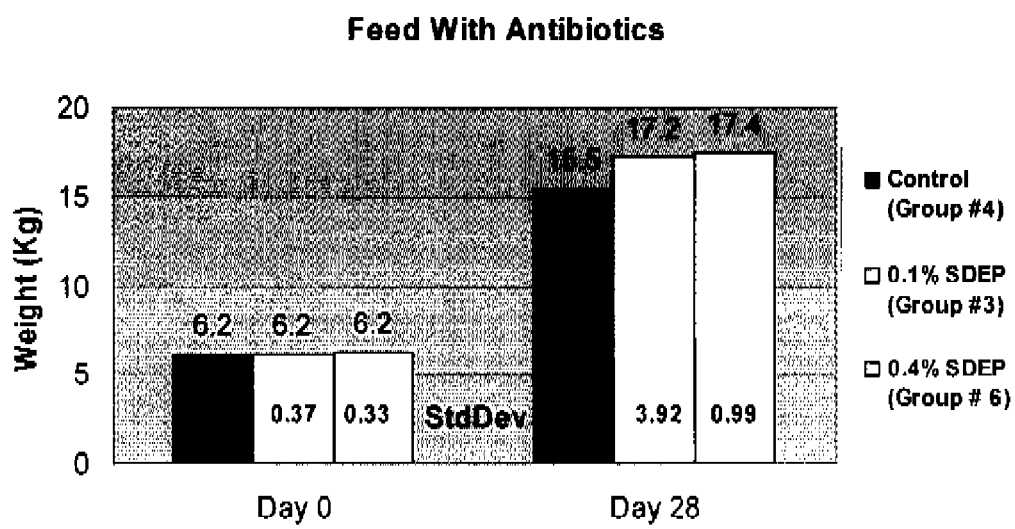
Figure 3:
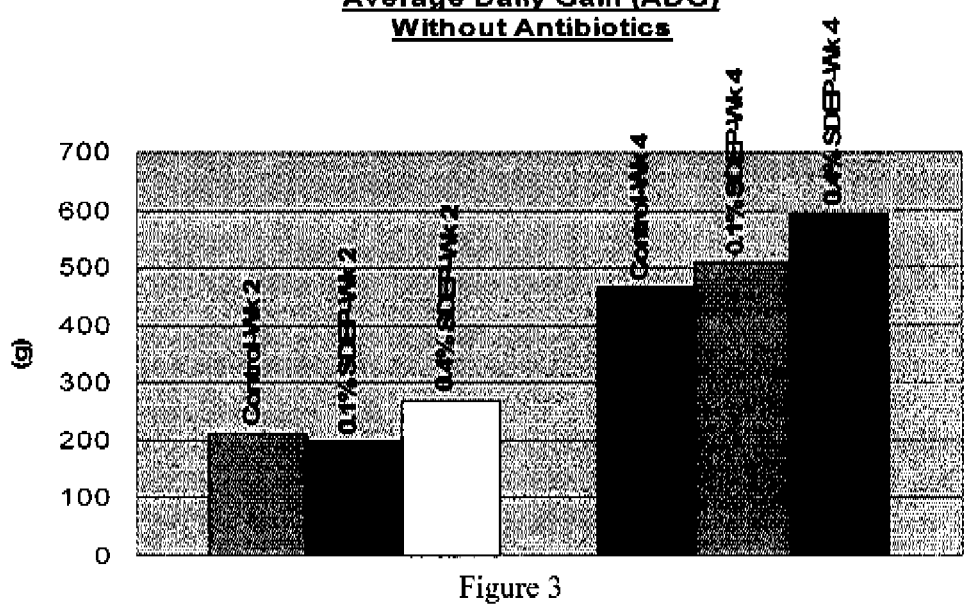
FIG. 3 is a bar graph corresponding to FIG. 1 but showing average daily gain.
Figure 4:
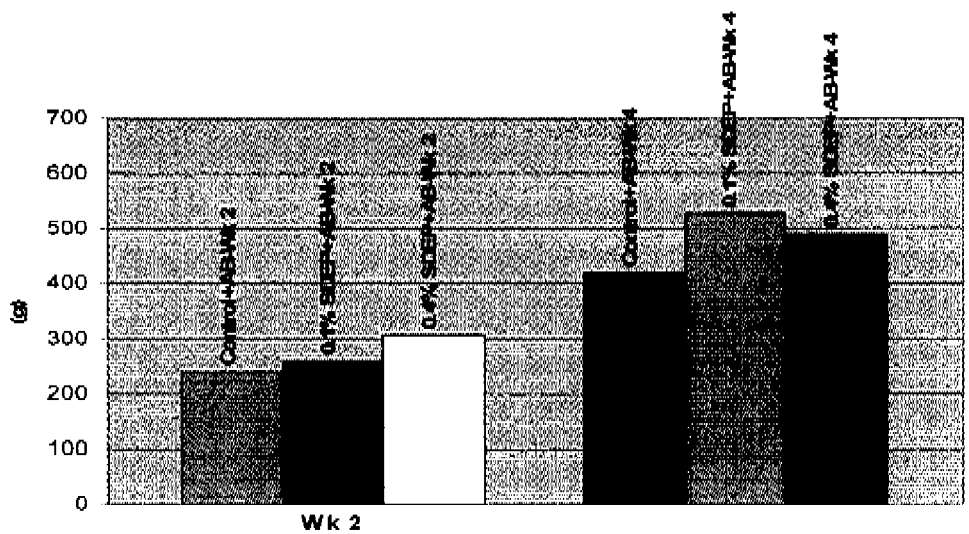
FIG. 4 is a bar graph corresponding to FIG. 2 but showing average daily gain.
Figure 5:
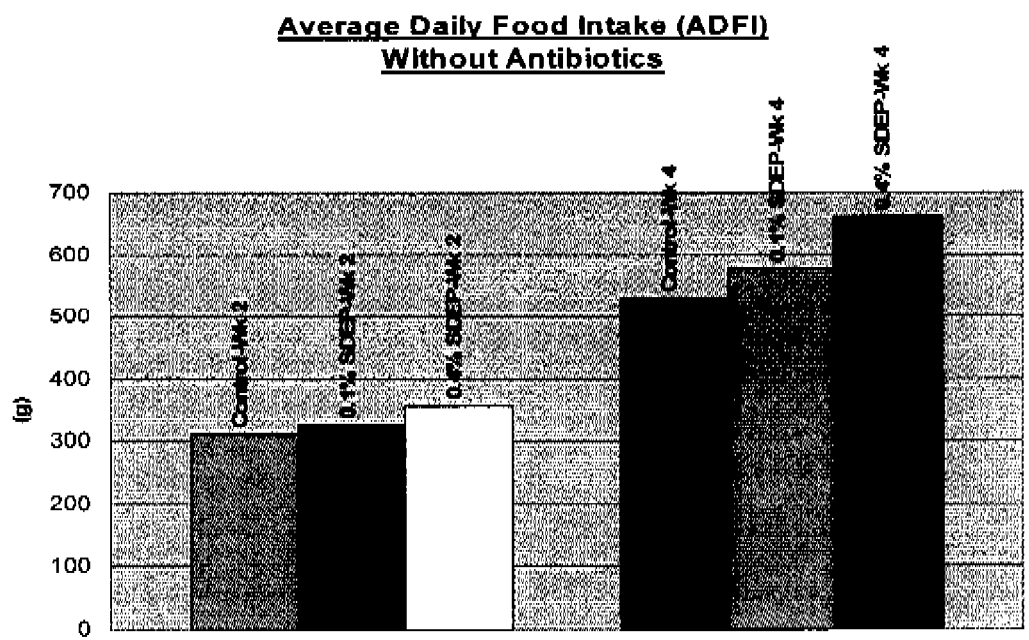
FIG. 5 is a bar graph corresponding to FIG. 1 but showing average daily food intake (ADFI).
Figure 6:
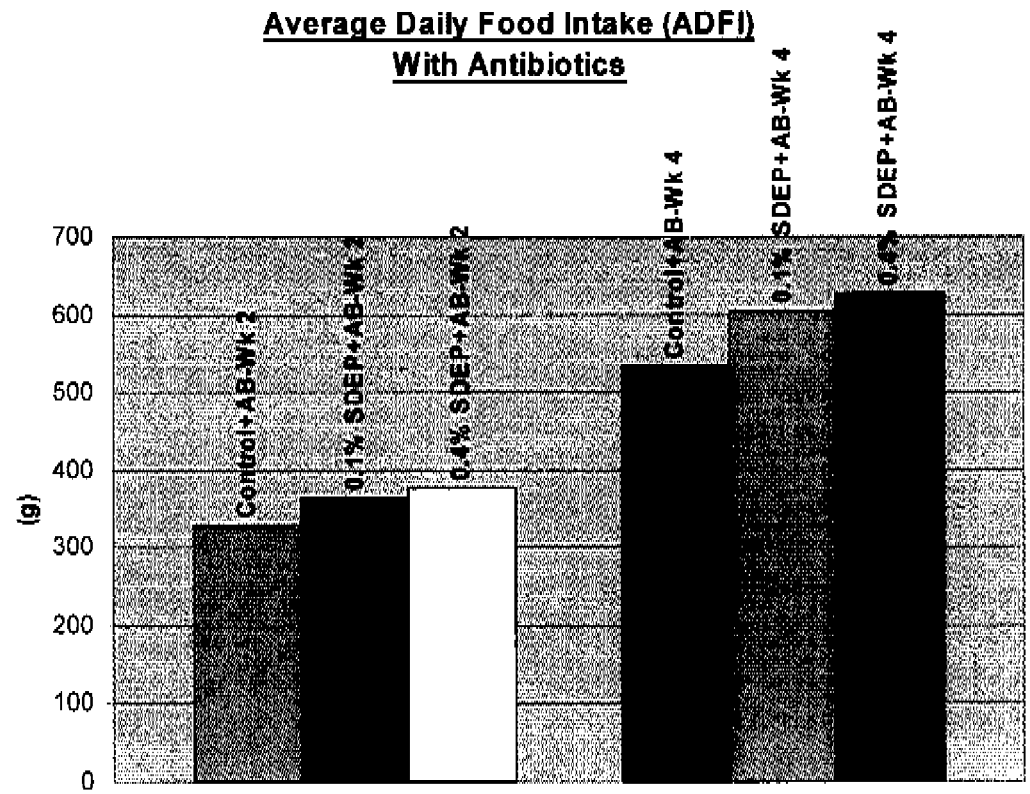
FIG. 6 is a bar graph corresponding to FIG. 2 but showing average daily food intake (ADFI).
Figure 13:
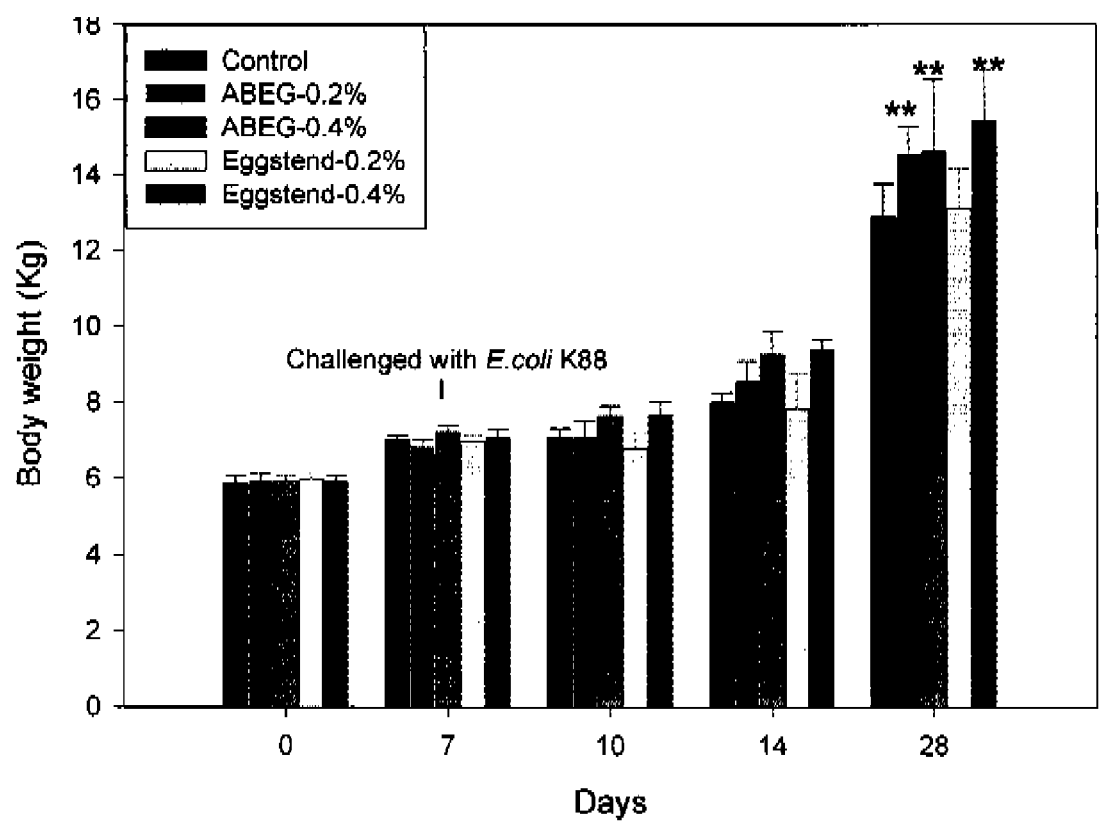

FIG. 13: Effect of diet on body weight increase. The increase in body weight was higher in the test groups than control group, on day 10, 14, and 28, except for group 4 (ABDEX 2%, 0.1% antibody egg powder+dextrose). On day 28, the increase of body weight in piglets of the three test groups ranged from 1.7-2.5 kg, over the control group, and the difference was statistically significant (p<0.01). Overall, the increase ranged from 13-20% over the control group. There was a slight increase in body weight in piglets fed diet 4, compared to the control diet, but the difference was not significant.

FIG. 14 is a bar graph showing the dietary effect on week 1 ADG of pigs.

FIG. 15 is a bar graph showing the dietary effect on week 2 ADG of ETEC challenged pigs.

FIG. 16 is a bar graph showing dietary effects on week 1 to 2 ADG of pigs.

FIG. 17 is a bar graph showing the dietary effects on pig performance during weeks 3 to 4.

Table 1: Measures of growth performance in piglets fed diets supplemented with or without antibiotics and/or SDEP.

Table 2: Effect of avian antibodies on improvement of growth and performance in field studies of piglets fed diet supplemented with 0.05-0.3% of antibody-containing spray-dried egg powder (SDEP), measuring average daily gain (ADG), average daily feed intake (ADFI) and morbidity and mortality.

Table 3: Composition of experimental diets (Phase 1).

Table 4: Composition of experimental diets (Phase 2).

Table 5: Effect of egg antibody on the performance of early (18-d old) weaned pigs.

Table 6: Diet formulation.

Table 7: ETEC K-88 dosing protocol.

Table 8: Clinical response of 18-day old piglets following challenge with different doses of *E. coli* K-88.

Table 9. Enumeration of ETEC in rectal swabs.

Table 10: Growth performance of pigs.

Table 11: Growth performance: body weight changes during the study period.

Table 12: Percentage body weight changes before and after feeding with diet supplemented with 0.4% avian antibodies.

Table 13: Treatment schedule.

Table 14: Clinical response after prophylactic treatment of piglets with control or antibody egg powder following challenge with $10^{12}$ CFU doses of ETEC K-88.

Table 15: Enumeration of ETEC in rectal swabs.

Table 16: Growth performance based on body weight increase.

Table 17: Growth performance based on ADG, ADFI and G/F.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

As used herein, "passive immunity" refers to the transfer of antibodies from an immunized animal to a non-immune recipient.

As used herein, "effective amount" refers to a dosage sufficient to have the desired effect.

As discussed above, improvements to gut health and that provide a more balanced gut microflora will improve animal growth. As such, supplementing animal feed with polyclonal antibodies directed against one or more pathogens is shown herein to improve growth of the animals, as shown in the attached figures and tables. As will be appreciated by one of skill in the art, the pathogens do not necessarily have to be causing disease, but may still consume nutrients or cause nutrients to be used less efficiently by the host animal, thereby reducing growth. Furthermore, improving gut health will have several beneficial effects, for example, reducing inflammation, which will in turn improve for example nutrient absorption and uptake. Thus, while not wishing to be bound by a specific hypothesis, it is believed that for example gut inflammation promotes feed uptake which in turn promotes growth. Similarly, mortality and morbidity are decreased because of the treatment and/or removal of disease but also by the promotion of growth.

As will be appreciated by one of skill in the art, generation of polygonal antibodies using a variety of host animals is well-known in the art. In one embodiment, the polyclonal antibodies are egg yolk antibodies.

In a preferred embodiment, a population of hens are immunized or challenged with one or more microbial antigens. That is, the entire population may be immunized with an antigen from a single microorganism or portions of the population may be immunized with different antigens from the same microorganism or portions of the population may be immunized with different antigens from different microorganisms.

Following immunization, the antibody-containing material is recovered once a suitable antibody titer has been obtained. As will be appreciated by one of skill in the art, titers may be maintained by rechallenge or reinoculation of hens over time. In some embodiments, the titer obtained from the eggs may be at least 1/256,000 compared to a control titer of 1/1600.

The antibody-containing material, for example, the whole egg or the egg yolk or the egg white or fraction(s) thereof, is then combined and is dried, for example spray dried or freeze dried, to a powder using means known in the art.

In some embodiments, the antibodies may be a powder, for example, a dried egg yolk powder.

The polyclonal antibodies may be a mixture of antibodies from several host animals. In some embodiments, the polyclonal antibodies may be a mixture of antibodies against different antigens from one pathogenic organism or multiple pathogenic organisms, as discussed above.

The pathogen may be selected from the group consisting of, *Bacillus cereus, Bacillus anthracis, Bacillus subtilis, Bacillus thuringiensis, Bacillus stearothermophilus, Vibrio parahemolyticus, Vibrio cholerae* O1, *Vibrio cholerae* non-O1, *Vibrio vulnificus, Aeromonas hydrophilia, Salmonella enterica, Salmonella typhi, Salmonella paratyphi, Salmonella entertidis, Salmonella cholerasuis, Salmonella typhimurium, Clostridium difficile, Clostridium botulinum, Clostridium perfringens, Staphylococcus aureus, Escherichia coli* (ETEC, EPEC, EHEC, EaggEC, UPEC and EIEC), *Campylobacter jejuni, Campylobacter coli, Campylobacter lari, Campylobacter fetus, Yersinia enterocolitica, Yersinia pestis, Yersinia pseudotuberculosis, Listeria monocytogenes, Plesiomonas shigelloides, Shigella, Streptococcus, Giardia lamblia, Entamoeba histolytica, Cryptosporidium parvum, Cylcospora cayetanenis, Amisakis, Diphyllobothrium, Nanophyetus, Eustrongylides, Acanthamoeba, Ascaris lumbricoides, Trichuris trichuris,* Hepatitis A virus, Hepatitis E virus, Rotavirus, Norwalk virus group, *Acinetobacter, Actinobacillus, Actinomycetes, Actinomyces, Aeromonas, Peptostreptococcus, Veillonella, Mobiluncus, Propionibacterium acnes, Lactobacillus, Eubacterium, Bifidobacterium, Bacteroides, Prevotella, Porphyromonas, Fusobacterium, Bordetella, Borrelia, Brucella, Burkholderia, Citrobacter, Corynebacterium, Edwardsiella, Enterobacter,* Enterobacteriaceae, *Klebsiella, Morganella, Proteus, Providencia, Serratia, Enterococcus, Erysipelothrix rhusopathiae, Francisella tularensis, Haemophilus, Helicobacter, Legionella pneumophilia, Leptospira interrogans,* Micrococcaceae, *Moraxella catarrhalis, Mycobacterium, Nocardias, Neissaria, Pasteurella multocida,* Pasteurellaceae, *Pseudomonas aeruginosa, Rhodococcus, Serratia marcescens, Stenotrophomonas maltophilia, Streptococcus pneumoniae, Streptomyces, Treponema* and combinations thereof.

As will be appreciated by one of skill in the art, the antibody-containing whole egg powder or egg yolk powder may be from hens immunized against a single pathogen or a mixture comprised of egg powder from hens immunized against different pathogens. Furthermore, the antibody-containing egg powder may be added to feed at a range of about 0.01% to about 1.0% or about 0.05% to about 1.0%. It is of note that the powder may be added to the feed or may be used to coat portions of the feed or may be otherwise presented to the animal.

Thus, in some embodiments, hens are immunized against an antigen from an organism or the organism itself. Eggs are then collected and the antibodies may be purified or concentrated using means known in the art.

As discussed above, supplementing feed with the polyclonal antibody containing egg powder has the surprising benefit of promoting growth, that is, of increasing daily food intake, increasing weight gain, and/or increasing average daily weight gain in an animal fed a feed ration supplemented with the polyclonal antibody containing egg powder compared to a control which was fed the feed ration only. Specifically, the control may comprise an animal of similar age and condition, fed a similar feed ration and regimen but without supplementation with the egg powder as discussed herein.

In a preferred embodiment of the invention, there is provided a method of increased growth in an animal comprising:

immunizing a population of hens with at least one bacterial antigen;

collecting eggs from the population of hens, said eggs containing antibodies raised against said at least one bacterial antigen;

recovering antibody-containing material from said eggs;

drying said antibody-containing material to a powder, thereby producing dried egg powder; and supplementing feed of an animal with 0.1-1.0% (w/w) of the dried egg powder, wherein said animal has increased growth compared to a control animal fed unsupplemented feed.

As will be appreciated by one of skill in the art, improved or increased growth can also be considered to be reduced gut inflammation, improved nutrient absorption and uptake, improved gut health, improved daily weight gain, improved weight gain over an extended time period or other suitable metrics as discussed herein.

The invention will now be described by way of examples. It is to be understood however that the examples are for illustrative purposes and are not necessarily limiting.

Example 1

Thirty-six 18 day old piglets (6.3±0.2 kg) were allocated to six treatment groups, blocked by weight and given ad libitum access to feed and water (n=6/group)

Each group was administered varying doses of SDEP containing antibodies to ETEC K88 and/or antibiotics for 28 days (Table 1).

Animals were weighed at the end of phase 1 (14 d) and phase 2 (28 d), and average daily gains were calculated.

| Group | Treatment |
|---|---|
| A | No antibiotics, no SDEP |
| B | Antibiotics*, no SDEP |
| C | No antibiotics, 1 kg/T SDEP |
| D | No antibiotics, 4 kg/T SDEP |
| E | Antibiotics*, 1 kg/T SDEP |
| F | Antibiotics, 4 kg/T SDEP |

*Antibiotic administered was Mecadox at a rate of 1.0%

Four individual field studies were conducted. In each study the control group of piglets were administered a normal diet, while the test groups' diets were supplemented with a specified amount of antibody-containing egg powder (SDEP) ranging from 0.5 kg/T to 3 kg/T. The piglets were monitored for growth performance.

Growth performance of animals fed diet with and without antibiotics and supplemented with SDEP:

Overall growth performance was improved in all groups supplemented with SDEP (C, D, E & F) compared with controls, with (B) or without antibiotics (B).

A significant level (P<0.05) of growth improvement was achieved when piglets were fed diet with only SDEP (4 kg/T) without antibiotics (D), compared with a diet that did not contain antibiotics (A) (Table 1).

In both phase 1 (0-14 d) and phase 2 (14-28 d), 4 kg/T SDEP increased growth performance by 25.3-27.6% (D) over the control group (A) while 1 kg/T SDEP increased growth performance by 9.2% (C) over the control group (A) in phase 2.

The combination with antibiotics, SDEP improved growth performance in both phase 1 and phase 2. SDEP at 1 kg/T (E) increased by 7.5-25% and SDEP at 4 kg/T (F) increased by 16.6-27.9%, over the control group (B) (Table 1).

Growth performance and reduction of mortality for animals fed diet supplemented with SDEP compared with controls:

Increased body weight gain by 1-3 kg

Improvement on average daily gain by 10.5-31.5% (Table 2)

Improvement on average daily feed intake by 15-20% (Table 2)

Improvement on mortality by 10-15% (Table 2B)

Improvement on morbidity by 25-40% (Table 2B)

It can be concluded from the experimental study that nursery diet supplemented with SDEP in absence of antibiotics increases body weight of piglets by 2.8 kg over the control. While. SDEP in presence of antibiotics increases body weight of piglets by 2.0 kg over the control.

Similar conclusions can be drawn from the four separate field studies as SDEP increases the live weight of piglets by 1-3 kg.

Based on the results obtained from both experimental and field studies, it can be concluded that Chicken egg antibodies in SDEP used in swine nursery diet are proved to be as a viable alternative to antibiotic growth promoters.

Example 2

Experimental Design

Thirty six crossbred (GAP Genetics, Winnipeg, MB, Canada) 18-d old pigs with an initial weight of 6.3±0.2 kg were allotted into six treatment groups: (1) control; (2) 0.1% SDEP; (3) 0.1% SDEP+antibiotics; (4) control+antibiotics; (5) 0.4% SDEP; (6) 0.4% SDEP+antibiotics. Pigs were blocked by weight and assigned to pens, and thus treatments, such that the average weight across treatments was similar.

Pigs were housed in stainless steel pens equipped with nipple waterers, stainless steel feeders, and plastic-coated expanded metal floors. The pens were located in an environmentally regulated building maintained at 25±2° C. with a 12-h light/dark cycle. Body weight and feed consumption were recorded after every phase and ad libitum access to feed and water was provided during the entire period of the study.

There were three pens per treatment and two pigs per pen. The pigs were fed a standard pig starter diet in phases 1 (Table 3) and 2 (Table 4). The diets were with or without spray-dried egg powder (SDEP) containing E. Coli K-88 antibodies and with or without antibiotics. The diets were fed in two phases. Both phases were fed for 14 days each. Pigs were allotted to treatments based on weaned weights and dam. Feed and water was available always. Pigs and feeders were weighed at the end of each phase to determine weight gains and feed disappearance. Pigs were observed every day for any changes in behavior due to the dietary treatments.

Results:

There was no mortality or morbidity and abnormal health problems observed in animals of group treated with feed supplemented with *Escherichia coli* antibody, chicken egg origin (SDEP), at 0.1-0.4% level during the 4-week study period. In contrast, the overall growth performance was found to be improved in groups treated with feed supplemented with *Escherichia coli* antibody, chicken egg origin (SDEP), at 0.1-0.4% level.

The growth performance data is presented in Table 5. The inclusion of 0.4% SDEP tended to improve performance in Phase 1. The combination of antibiotics and SDEP tended to increase growth performance in Phase 1 by 30% for 0.1% SDEP and 15% for 0.4% SDEP inclusion rates. In Phase 2, 0.1% SDEP increased growth performance by 9.2% over the control group. Inclusion of 0.4% SDEP in the diet increased growth performance by 27.6% over the control group. Feed efficiency tended to be improved by 0.4% SDEP in the diet.

The results of this study demonstrated that the addition of 0.4% SDEP to the diets of early weaned pigs improved growth performance. This can be seen on review of FIGS. 1-6.

Example 3

Determination of Infective Dose of *E. coli* K-88

Animal Use and Feeding

Thirty crossbred 18-d old pigs (body weight 5.5-6.5 kg) were randomly allotted to 15 pens with 2 pigs per pen. Pens were randomly assigned to 5 treatments with 3 pens per treatment. Same regular nursery diet was fed to pigs across treatments for week 1 (Table 6). In week 2, pigs were switched to basal phase 1 diet supplemented with 0.4% antibody egg powder. In week 3 & 4, pigs were switched to phase 2 nursery diets. Pigs were allowed ad libitum access to water and feed.

*E. coli* Inoculums Preparation

The particular *E. coli* K-88 strain, different from the one used for producing antigen in order to produce avian antibodies, was isolated and propagated at the Department of Veterinary Diagnostic Laboratory, College of Veterinary Medicine, University of Minnesota, St. Paul.

*E. coli* K88 obtained from case D05-29173 was initially grown on a sheep blood agar plate for 18 hours at 37° C. One isolated colony was aseptically removed, placed in 2 ml sterile distilled water and mixed thoroughly. A sterile swab was dipped into the *E. coli* suspension and excess inoculums removed by rotating the swab against the inside wall of the tube above the fluid level. A 150 mm sheep blood Mueller-Hinton agar plate (BD Diagnostics, Sparks, Md. 21152) was inoculated by streaking the swab over the entire surface in three different directions ensuring an even distribution of the inoculum for a confluent lawn of growth. This process was used to inoculate 10 sheep blood Mueller-Hinton agar plates. The plates were incubated for 15-18 hours at 37° C.

After incubation, a sterile tissue cell scraper was used to remove the bacteria growing on the agar plate by gently scraping the agar surface. Bacteria on the scraper were placed into 200 ml sterile saline. This process was repeated with all the Mueller-Hinton agar plates. The *E. coli* saline was mixed thoroughly to obtain a homogeneous suspension.

Once a homogenous suspension was obtained, serial dilutions were made in sterile saline until an optical density equal to a 0.5 McFarland was obtained. The concentration of the challenge suspension was adjusted to $10^{10}$ and $10^{12}$ cells/ml. This was placed in sterile 5 cc syringes, which were labeled and kept cold until the pigs were orally dosed.

To determine the challenge suspension colony forming unit concentration per ml, an aliquot was serially diluted and fixed volume plated onto blood agar plates which were incubated at 37° C. for 15-18 hours. After incubation, plates with 30-300 colonies were counted and the concentration of viable bacteria per ml determined.

Treatment Arrangement & Dosing Scheme

As described in Table 7, pigs were given PBS solutions (control), or 5 mls of PBS solution with $10^{10}$ or $10^{12}$ cfu/ml of *E. coli* K-88 at 0 hr of day 1 (E-10 and E-12), or 5 mls of PBS solution with $10^{10}$ or $10^{12}$ (cfu/ml) at 0 and 5 hr of day 1 (E-10-10 and E-12-12).

Data Collection and Sampling

Pigs were weighed on day 1, 3, 7, 14, and 28 to determine growth rate. Feed disappearance was recorded on day 7, 14, and 28. Average daily feed intake (ADFI), average daily gain (ADG), and feed efficiency (G/F) were calculated accordingly.

Daily clinical observation was assured to record incidence of diarrhea, fecal consistency score, appetite and mortality. Fecal scores were recorded as 0=normal, 1=light, 2=medium, and 3=severe, to indicate diarrhea severity.

Rectal swabbing (BBL culturette and transport swab, BD Diagnostics, Sparks, Md., 21152) were taken at 0 hr before infection, 6, 24, 48, 72, and 120 hr after infection. Rectal swabs in cold pack were delivered within 24 hr to Veterinary Diagnostic Laboratory, College of Veterinary Medicine, University of Minnesota, St. Paul, for isolation and identification of ETEC.

Laboratory Analysis

The swab portion of a BBL culturette and transport swab (BD Diagnostics, Sparks, Md., 21152) was placed into 2 ml of sterile water and mixed thoroughly. Serial 10 fold dilutions were made and each dilution plated onto separate MacConkey agar plate. After 15-18 hours of incubation at 37° C., the plates containing 30-300 lactose positive colonies typical of *E. coli* were counted, averaged and the total bacteria per swab calculated.

Incidence of Diarrhea, Fecal Consistency and Pig Loss

During the first week post-infection, fecal score, enumeration of ETEC and pig loss were recorded to establish incidence and severity of diarrhea. Piglets infected with higher doses of ETEC had incidence of diarrhea at 6 hours post-infection; while piglets with lower dose of ETEC had diarrhea at later stages. However, piglets from single infected group with $10^{12}$ CFU, double infected group with $10^{10}$ and $10^{12}$ CFU of ETEC had higher diarrhea incidents. The average fecal score was higher for piglets from $10^{12}$ CFU of ETEC infected group, and 3 piglets were lost within 72 hour post-infection with double dose of $10^{12}$ CFU. Numerically, $10^{12}$ CFU of ETEC caused increased diarrhea and fecal score. In control group, 2 piglets had mild diarrhea with fecal score of 1-2. Similarly, at the lowest dose only 2 piglets had diarrhea with a low fecal score. The results are illustrated in Table 8.

Rectal ETEC Isolation

Rectal swabs from each piglet were cultured to enumerate ETEC concentration at each time points, 0, 6, 24, 48 and 120 hr post-infection. In all groups, ETEC numbers were changed with the hours of post-infection. Rectal swabs from groups infected with single dose of ETEC had the highest number bacteria at 48 hour post-infection, while double-infected piglets with $10^{10}$ and $10^{12}$ CFU of ETEC had the highest peaks of ETEC concentration at 72 hours. All ETEC concentration decreased to undetectable level after 72 hr. The average ETEC count from each group at each time point is shown in Table 9 and FIG. 7.

It has been established from this study that there is a definite relationship between the K-88 ETEC infection dose with the incidence and severity of diarrhea in 18-day old piglets. Increasing ETEC concentration decreased growth rate, and increase diarrhea incidents. Double infection dose using $10^{12}$ CFU had significant impact on piglet growth, severity of diarrhea, mortality and presence of ETEC in rectal swab, while single dose of $10^{12}$ CFU is sufficient for inducing diarrhea in pigs fed regular diet.

Based on the results from the Study 3, it was concluded that to determine the prophylactic efficacy of E. coli K-88 avian antibodies, piglets will be infected with a single dose of ETEC $10^{12}$ CFU (Study—2).

Growth Performance

Four pigs died within the first week post ETEC infection (Table 10). ADG and ADFI were calculated after corrected with pig loss. The corrected growth performance of pigs is shown in Table 10.

During the first 3 days post infection, pigs from all treatments lost weight. Pigs double-dosed with $10^{12}$ CFU of ETEC had the greater weight loss than pigs from other treatment. During 4 to 7 days post infection, similar trend was observed in growth, pigs recovered with increasing growth, pigs from control group and double $10^{10}$ CFU-infected group had greater ADG compared to pigs from double $10^{12}$ CFU-infected group. During the first week post infection, feed intake (ADFI) was also lower for pigs infected with double $10^{12}$ CFU (FIG. 8).

Overall for the first week post-infection, pigs from control group (without ETEC challenge) had numerically greater ADG compared to pigs from other group (P>0.08), especially greater gain and feed efficiency than pigs from double $10^{12}$ CFU-infected group (PC<0.08).

As the animals were sick, to avoid further loss of animals, and to determine the effect of avian antibodies on recovery of the sick animals as well as on growth performance, on day 7, pigs were switched to diets supplemented with 0.4% antibody egg powder.

After feeding diet supplemented with 0.4% ETEC antibody, the growth rate of piglets was determined to be similar or higher compared to the uninfected control animals, particularly during day 8-14 post-infection. Also, it can be indicated from the results that piglets infected with lower doses of ETEC recovered at faster rate than piglets infected with higher doses. The results are shown in Tables 11 and 12 and FIGS. 9-12.

No difference in ADG was observed among treatments, which may indicate the beneficial effect of avian antibody on post infection pig recovery. Pigs from control group ate more feed than pigs from double $10^{12}$ CFU-infected group (P<0.08).

Overall, during Phase 1, pigs from $2 \times 10^{12}$ CFU-infected group had lower ADG than pigs from $2 \times 10^{10}$ CFU-infected group, but not different compared with pigs from other groups.

During week 3 and 4, pigs were switched to Phase 2 diet with 0.4% antibody egg powder. Continuing recovery of pigs was observed across treatments. There was no difference in ADG and ADFI among pigs from different treatments.

Increasing ETEC concentration decreased growth rate and after feeding diet supplemented with 0.4% K-88 avian antibodies, piglets recovered at similar or better rate to the controls. Therefore, it can be suggested that piglets infected at various doses of ETEC can be recovered completely following feeding with diet supplemented with 0.4% E. coli K-88 avian antibodies.

Example 4

Prophylactive Efficacy of E. coli K-88 Avian-Antibody Products

Animal Use and Treatment

Thirty crossbred 18-d old pigs (body weight 5.5-6.5 kg) were randomly allotted to 15 pens with 2 pigs per pen. Pens were randomly assigned to 5 treatments with 3 pens per treatment. Five experimental diets were fed to pigs across treatments for week 1 and 2 (Table 8). The diets were made by adding either control egg powder from unimmunized chickens (group-1 EG) or E. coli K88 antibody, chicken origin, (Serial 12-04, Lot-003, Inovatech Egg Products, Lot #5078) at different concentrations (Test groups, 2-5, ABEG 2%, ABEG 4%, ADDEX 2% or ABDEX 4%), to basal diets used in the study 3. In week 3 and 4, pigs were switched to phase 2 nursery diets. Pigs were allowed ad libitum access to water and feed.

E. coli Inoculums Preparation and Challenging

At day 7, following feeding with control and test diets, piglets were challenged by orally dosing 5 mL of ETEC K-88 at $10^{12}$ cfu/ml suspended in PBS, following similar procedure as described above.

Clinical Observation and Data Collection

Daily clinical observation was assured to record incidence of diarrhea, fecal consistency scores appetite and mortality. Fecal scores were recorded as 0=normal, 1=light, 2=medium, and 3=severe, to indicate diarrhea severity.

Rectal swabs were taken at 0 hr before infection, 6, 24, 48, 96, and 120 hr after infection. Rectal swabs in cold pack were delivered within 24 hr to Veterinary Diagnostic Laboratory, College of Veterinary Medicine, University of Minnesota, St. Paul, for isolation and enumeration of ETEC, following the procedure described above.

Pigs were weighed on day 0, 7, and 10, 14, and 28 to determine growth rate. Feed disappearance was recorded at day 7, 14, and 28. Average daily feed intake (ADFI), average daily gain (ADG), and feed efficiency (C/F) were calculated accordingly.

Statistics

Data were analyzed by using the GLM procedures of SAS (1999) for LSMEAN. For ETEC counting, fecal score and ADG, the statistical model uses individual pigs as experiment units. ADFI calculation uses pen as unit. The body weight at day 7 was used as covariate to analyze growth response. Following orthogonal contrasts (Steel and Torrie, 1980) were used to characterize main effects of treatments: 1) egg powder vs. antibody egg powder; 2) egg powder vs. antibody-dextrose; 3) antibody egg powder vs. antibody dextrose. Polynomial regressions (Steel and Torrie, 1980) for unequally spaced treatments were used to characterize the shape of the ETEC response to the timely change.

Incidence of Diarrhea, Fecal Consistency and Pig Loss

During the first week post-infection, fecal score, enumeration of ETEC and pig loss were recorded to establish incidence and severity of diarrhea. Piglets in the control group, fed with 0.4% egg powder from unimmunized chicken for 7 days, following infection with $10^{12}$ CFU ETEC had higher incidence of diarrhea, compared to the test groups, which were fed with various concentrations (0.1-0.4%) of antibody egg powder. However, severity and incidence of diarrhea among piglets varied in test groups. Piglets fed with either 0.4% antibody egg powder (ABEG 4%) or 0.2% antibody egg powder and dextrose (0.4% Eggstend, ABDEX 4%) had the lowest incidence of diarrhea. However, no mortality was observed in the test group, when piglets were fed with 0.4% antibody egg powder ABDEX 4%. The highest incidence of diarrhea and mortality were observed in piglets, which were fed with 0.1% antibody egg powder and dextrose (0.2% Eggstend, ABDEX 2%) and 0.2% antibody egg powder (ABDEX 2%). The results are illustrated in Table 14.

Isolation of ETEC from Rectal Swabs

Rectal swabs from each piglet were cultured to enumerate ETEC concentration at each time points, 0, 6, 24, 48 and 120 hr post-infection. In all groups, ETEC numbers were changed with the hours of post-infection. Rectal swabs from ETEC infected piglets had the highest number bacteria at 48 hour post-infection, as observed in the Study 3. At 48 hr post infection, rectal ETEC isolation were significantly higher for piglets fed control diet than pigs fed 2 or 4% ABEG or 4% ABDEX diet.

The highest number of ETEC average count per swab was determined to be $29.6 \times 10^6$ CFU in the control group, while in the test groups, the average count ranged from $0.16$-$2.13 \times 10^6$ CFU. ETEC concentration decreased to undetectable level after 96 hr. However, at 120 hr post infection, piglets fed with control diet or 2% ABDEX had rectal ETEC isolation. The average ETEC count at each time point is shown in Table 15.

Growth Performance

Six pigs died within 1st week post infection. Growth performance was calculated with correction for pig loss.

Through week 1 and 2, pigs were fed different experimental diets. In 1st week, pigs from control group grew similar to the pigs from other groups. At day 7, all pigs were infected with $10^{12}$ CFU of ETEC. During three days post-infection, most of pigs' growth rates were reduced numerically, especially for pigs fed control diet. During 4-7 days post-infection, pigs recovered in terms of ADG, except pigs fed control diet (egg powder from unimmunized chicken) and 2% ABDex diet (0.1% antibody egg powder+dextrose). Overall, during 1st week post-infection, pigs fed 4% ABEG diets (0.4% antibody-egg powder) and 4% ABDex (0.2% antibody egg powder+dextrose) had greater ADG compared to pigs fed control diet, and numerically greater than 2% ABDex diet (0.2% antibody egg powder).

For period of week 1 and 2, pigs fed 4% ABDex and 4% AB diet had greater ADG, ADFI and feed efficiency compared to pigs fed other diets.

In week 3 and 4, pigs were switched to Phase 2 treatment diets. There was no difference in final weight, ADG and G/F, though pigs fed 2% ABEG and 4% ABDEX gained 25% and 10% more daily than control diet. ADFI was 43.4% higher for pigs fed 4% ABDEX during this period.

The results are illustrated in Tables 16 and 17, and FIGS. 13-17.

Feeding antibody egg powder and antibody dextrose did not positively impact growth rate, fecal consistency or diarrhea incidence of pigs in 1st week post weaning. However, feeding 0.4% antibody egg powder or 0.2% antibody plus dextrose improved the growth performance and recovery of pigs post ETEC infection. Piglets fed with lower dose of antibody egg powder at 0.1% with dextrose for 14 days did not improve the growth performance on day 28, but reduced the bacterial load in the swab samples following challenge with high dose of ETEC. While, piglets fed with 0.2% antibody egg powder for 14 days improved the growth performance on day 28, and reduced the bacterial load in the swab samples following challenge with high dose of ETEC.

In contrast, piglets fed with control egg powder for the same time period, had very high count of ETEC in their swab samples and the body weight was found to be the lowest, compared to the test groups.

Therefore, based on the results, it can be suggested that K-88 antibody containing egg powder at 0.2-0.4% level with or without the presence of dextrose can be used for prophylactic treatment of post-weaning diarrhea as well as improvement of growth.

While the preferred embodiments of the invention have been described above, it will be recognized and understood that various modifications may be made therein, and the appended claims are intended to cover all such modifications which may fall within the spirit and scope of the invention.

TABLE 1

Measures of growth performance in piglets fed diets supplemented with or without antibiotics and/or SDEP.

|  |  | Treatment Group | | | | | |
|---|---|---|---|---|---|---|---|
|  | Measures | A | B | C | D | E | F |
|  | # of Piglets | 6 | 6 | 6 | 6 | 6 | 6 |
|  | Mean initial weight (kg) | 6.0 | 6.2 | 6.1 | 6.2 | 6.2 | 6.2 |
| Days 0-14 | Mean final weight (kg) | 9.0 | 9.6 | 8.9 | 10.0 | 9.8 | 11.6 |
|  | Avg. daily gain (g) | 213 | 240 | 198 | 267 | 258 | 307 |
|  | Avg. daily intake (g) | 310 | 328 | 325 | 356 | 364 | 376 |
|  | Mean feed/gain | 1.44 | 1.63 | 1.40 | 1.38 | 1.31 | 1.22 |
| Days 14-28 | Mean final weight (kg) | 15.6 | 15.4 | 16.0 | 18.4 | 17.2 | 17.4 |
|  | Avg. daily gain (g) | 466 | 421 | 509 | 595 | 527 | 491 |
|  | Avg. daily intake (g) | 527 | 532 | 577 | 659 | 604 | 627 |
|  | Mean feed/gain | 1.13 | 1.35 | 1.13 | 1.1 | 1.12 | 1.12 |

TABLE 2

Effect of avian antibodies on improvement of growth and performance in field studies of piglets fed diet supplemented with 0.05-0.3% of antibody-containing spray-dried egg powder (SDEP), measuring average daily gain (ADG), average daily feed intake (ADFI) and morbidity and mortality.

|  | Field Study #1 | | Field Study #2 | |
|---|---|---|---|---|
| A | Control | Test (0.05%) | Control | Test (0.3%) |
| # Piglets | 1156 | 1163 | 4338 | 1716 |
| Days on feed | 59.6 | 58.4 | 59.0 | 57.8 |
| Initial weight (kg) | 5.3 | 5.2 | 7.27 | 6.93 |
| Final weight (kg) | 28.0 | 28.8 | 23.81 | 27.22 |
| ADG (g) | 381 | 404 | 318 | 351 |
| ADFI (g) | 544 | 627 | 620 | 750 |

TABLE 2-continued

Effect of avian antibodies on improvement of growth and performance in field studies of piglets fed diet supplemented with 0.05-0.3% of antibody-containing spray-dried egg powder (SDEP), measuring average daily gain (ADG), average daily feed intake (ADFI) and morbidity and mortality.

|  | Field Study #3 | | Field Study #4 | |
|---|---|---|---|---|
| B | Control | Test (0.2%) | Control | Test (0.3%) |
| # Piglets | 20 | 20 | 20 | 20 |
| Days on feed | 14 | 14 | 14 | 14 |
| Initial weight (kg) | 8.2 | 8.2 | 8.0 | 8.0 |
| Final weight (kg) | 12.7 | 14.1 | 11.5 | 12.4 |
| ADG (g) | 321 | 422 | 250 | 314 |
| Morbidity (%) | 30 | 5 | 50 | 10 |
| Mortality (%) | 10 | 0 | 15 | 0 |

TABLE 3

Composition of experimental diets (Phase 1)

| Treatments | 1 Control | 2 0.1% SDEP | 3 0.1% SDEP + AB | 4 Control + AB | 5 0.4% SDEP | 6 0.4% SDEP + AB |
|---|---|---|---|---|---|---|
| Ingredients | | | | | | |
| Corn | 49.1 | 48.1 | 49.1 | 48.1 | 49.1 | 48.1 |
| SBM | 28.5 | 28.5 | 28.5 | 28.5 | 28.3 | 28.3 |
| Fishmeal | 7 | 6.9 | 6.9 | 7 | 6.8 | 6.8 |
| SDEP[1] |  | 0.1 | 0.1 |  | 0.4 | 0.4 |
| Whey powder | 12 | 12 | 12 | 12 | 12 | 12 |
| Blended fat | 2 | 2 | 2 | 2 | 2 | 2 |
| Limestone | 0.55 | 0.55 | 0.55 | 0.55 | 0.55 | 0.55 |
| Di-calcium Phosphate | 0.1 | 0.1 | 0.1 | 0.1 | 0.1 | 0.1 |
| Salt | 0.25 | 0.25 | 0.26 | 0.25 | 0.25 | 0.25 |
| Vitamins-Trace mineral premix | 0.3 | 0.3 | 0.3 | 0.3 | 0.3 | 0.3 |
| Mecadox |  |  | 1.0 | 1.0 |  | 1.0 |
| Choline chloride | 0.2 | 0.2 | 0.2 | 0.2 | 0.2 | 0.2 |
| TOTAL | 100 | 100 | 100 | 100 | 100 | 100 |
| Nutrient Analyses | | | | | | |
| ME, Kcal/kg | 3307 | 3308 | 3308 | 3309 | 3321 | 3320 |
| Crude protein (%) | 23.2 | 23.1 | 23.1 | 23.2 | 23.1 | 23.1 |
| Calcium (%) | 0.88 | 0.87 | 0.87 | 0.88 | 0.87 | 0.87 |
| Total phosphorus (%) | 0.69 | 0.69 | 0.69 | 0.69 | 0.69 | 0.69 |
| Lysine (%) | 1.45 | 1.45 | 1.45 | 1.45 | 1.45 | 1.45 |
| Methionine (%) | 0.35 | 0.35 | 0.35 | 0.35 | 0.35 | 0.35 |
| Threonine (%) | 0.95 | 0.95 | 0.95 | 0.95 | 0.95 | 0.95 |
| Tryptophan (%) | 0.29 | 0.29 | 0.29 | 0.29 | 0.29 | 0.29 |

[1]SDEP; Spray-dried egg powder

TABLE 4

Composition of experimental diets (Phase 2)

| Treatments | 1 Control | 2 0.1% SDEP | 3 0.1% SDEP + AB | 4 Control + AB | 5 0.4% SDEP | 6 0.4% SDEP + AB |
|---|---|---|---|---|---|---|
| Ingredients, % | | | | | | |
| Corn | 61.2 | 61.2 | 60.2 | 60.2 | 61.2 | 60.2 |
| SBM | 25 | 25.0 | 25 | 25 | 24.8 | 24.8 |
| Fishmeal | 5 | 4.9 | 4.9 | 5 | 4.8 | 4.8 |
| SDEP[1] |  | 0.1 | 0.1 |  | 0.4 | 0.4 |

TABLE 4-continued

Composition of experimental diets (Phase 2)

| Treatments | Groups | | | | | |
|---|---|---|---|---|---|---|
| | 1 Control | 2 0.1% SDEP | 3 0.1% SDEP + AB | 4 Control + AB | 5 0.4% SDEP | 6 0.4% SDEP + AB |
| Whey powder | 5 | 5 | 5 | 5 | 5 | 5 |
| Blended fat | 2 | 2 | 2 | 2 | 2 | 2 |
| Limestone | 0.8 | 0.8 | 0.8 | 0.8 | 0.8 | 0.8 |
| Dicalcium Phosphate | 0.2 | 0.2 | 0.2 | 0.2 | 0.2 | 0.2 |
| Salt | 0.25 | 0.25 | 0.25 | 0.25 | 0.25 | 0.25 |
| Vitamins-Trace mineral premix | 0.3 | 0.3 | 0.3 | 0.3 | 0.3 | 0.3 |
| Mecadox | | | 1.0 | 1.0 | | 1.0 |
| Choline chloride | 0.2 | 0.2 | 0.2 | 0.2 | 0.2 | 0.2 |
| TOTAL | 100 | 100 | 100 | 100 | 100 | 100 |
| Nutrient Analyses | | | | | | |
| ME, Kcal/kg | 3332 | 3334 | 3331 | 3330 | 3336 | 3332 |
| Crude protein (%) | 20.4 | 20.4 | 20.4 | 20.4 | 20.4 | 20.4 |
| Calcium (%) | 0.78 | 0.78 | 0.78 | 0.78 | 0.78 | 0.78 |
| Total phosphorus (%) | 0.59 | 0.59 | 0.59 | 0.59 | 0.59 | 0.58 |
| Lysine (%) | 1.21 | 1.21 | 1.21 | 1.21 | 1.21 | 1.21 |
| Methionine (%) | 0.32 | 0.32 | 0.32 | 0.32 | 0.32 | 0.32 |
| Threonine (%) | 0.81 | 0.81 | 0.81 | 0.81 | 0.81 | 0.81 |
| Tryptophan (%) | 0.24 | 0.24 | 0.25 | 0.24 | 0.24 | 0.25 |

[1]SDEP; Spray-dried egg powder

TABLE 5

Effect of egg antibody on the performance of early (18-d old) weaned pigs

| Treatments | Groups | | | | | | | |
|---|---|---|---|---|---|---|---|---|
| | 1 Control | 2 0.1% SDEP[1] | 3 0.1% SDEP + AB[2] | 4 Control + AB | 5 0.4% SDEP | 6 0.4% SDEP + AB | SEM | $P_{value}$ |
| Phase 1 | | | | | | | | |
| No. of pigs | 6 | 6 | 6 | 6 | 6 | 6 | | |
| Start weight (kg) | 6.1 | 6.1 | 6.2 | 6.2 | 6.2 | 6.2 | | |
| End Weight (kg) | 9.0 | 8.9 | 9.8 | 9.6 | 10.0 | 11.6 | | |
| ADFI (g) | 310 | 325 | 364 | 328 | 356 | 376 | 20.9 | NS |
| ADG (g) | 213 | 198 | 258 | 240 | 267 | 307 | 27.2 | NS |
| G:F | 0.69 | 0.61 | 0.71 | 0.72 | 0.76 | 0.82 | 0.07 | NS |
| Phase 2 | | | | | | | | |
| No. of pigs | 6 | 6 | 6 | 6 | 6 | 6 | | |
| Start weight (kg) | 9.0 | 8.9 | 9.8 | 9.6 | 10.0 | 11.6 | | |
| End Weight (kg) | 15.6 | 16.0 | 17.2 | 15.4 | 18.4 | 17.4 | | |
| ADFI (g) | 527 | 577 | 604 | 532 | 659 | 627 | 58.6 | NS |
| ADG (g) | 466 | 509 | 527 | 421 | 595 | 491 | 69.0 | NS |
| G:F | 0.88 | 0.88 | 0.89 | 0.74 | 0.90 | 0.79 | 0.08 | NS |

[1]SDEP; spray dried egg product
[2]AB; antibiotic, mecadox

TABLE 6

Diet Formulation

| | Phase 1 | Phase 2 |
|---|---|---|
| Ingredients | | |
| Corn | 48.02 | 58.43 |
| SBM | 28.33 | 25.00 |
| Dried whey | 15.00 | 10.00 |
| Fishmeal | 6.00 | 4.00 |
| Premix base | 0.50 | 0.50 |
| Lysine-HCl | 0.10 | 0.05 |
| DL-methionine | 0.05 | 0.02 |
| Blended Animal fat | 2.00 | 2.00 |
| | 100 | 100 |
| Calculated Analysis | | |
| Crude protein (%) | 25.5 | 22.10 |
| ME, kcal/kg | 3300 | 3300 |

TABLE 6-continued

Diet Formulation

|  | Phase 1 | Phase 2 |
|---|---|---|
| Lysine (%) | 1.68 | 1.37 |
| Methionine (%) | 0.42 | 0.36 |
| Tryptophan (%) | 0.33 | 0.28 |
| Threonine (%) | 1.12 | 0.93 |
| Ca (%) | 0.90 | 0.81 |
| P (%) | 0.78 | 0.64 |

TABLE 7

ETEC K-88 Dosing Protocol

| Treatment | # of Pigs | *E. coli* K-88 conc. (cfu/ml) | Dosage in mL | Frequency (hr) |
|---|---|---|---|---|
| control | 6 | 0 | 5 | 0 |
| *E. coli* $10^{10}$ | 6 | $10^{10}$ | 5 | 0 |
| *E. coli* $10^{12}$ | 6 | $10^{12}$ | 5 | 0 |
| *E. coli* $2 \times 10^{10}$ | 6 | $10^{10}$ | 5 | 0 and 5 |
| *E. coli* $2 \times 10^{12}$ | 6 | $10^{12}$ | 5 | 0 and 5 |

TABLE 8

Clinical response of 18-day old piglets following challenge with different doses of *E. coli* k-88

| Groups | Number of animals with diarrhea | No. pigs with diarrhea (fecal score) with time (hours) post-infection) | | | | |
|---|---|---|---|---|---|---|
|  |  | 6 | 24 | 48 | 72 | 96 | 120 |
| Control | 2/6 | 0 | 0 | 2(1.5) | 1(1.0) | 1(1.0) | 0 |
| *E. coli* $10^{10}$ | 2/6 | 0 | 2(1.5) | 0 | 2(1.0) | 2(1.5) | 1(1.0) |
| *E. coli* $2 \times 10^{10}$ | 6/6 | 0 | 3(1.8) | 3(1.0) | 5(1.4) | 5(1.4) | 5(1.0) |
| *E. coli* $10^{12}$ | 5/6 | 1(3.0) | 4(2.0) | 4(1.8) | 3(2.3) | 3(1.7) | 3(1.0) |
| *E. coli* $2 \times 10^{12}$ | 4/6 | 2(3.0) | 4(2.25)* | 3(2.3)* | 2(2.5)* | 1(2.0) | 1(2.0) |

Fecal scores were recorded as 0 = normal, 1 = light, 2 = medium, and 3 = severe, to indicate diarrhea severity. 2(3.0) indicates 2 pig had diarrhea with an average score of 3.0.
*indicates that one piglet was dead at each time point. Another piglet in group infected with $10^{10}$ was dead on day 7 post-infection.

TABLE 9

Enumeration of ETEC in Rectal Swabs

|  | Control | *E. coli* $10^{10}$ | *E. coli* $10^{12}$ | *E. coli* $2 \times 10^{10}$ | *E. coli* $2 \times 10^{12}$ |
|---|---|---|---|---|---|
| $1^{st}$ Pre swab, $\times 10^6$ cfu/ml | 0.12 | 0.13 | 1.40 | 0.97 | 0.20 |
| 6 hr swab, $\times 10^6$ cfu/ml | 1.40 | 0.15 | 0.41 | 0.36 | 0.21 |
| 24 hr swab, $10^6$ cfu/ml | 0.07 | 0.14 | 1.39 | 0.67 | 1.57 |
| 48 hr swab $10^6$ cfu/ml | 5.22 | 5.23 | 14.26 | 0.83 | 4.34 |
| 72 hr swab $10^6$ cfu/ml | 0.23 | 4.49 | 2.01 | 4.92 | 20.91 |
| 120 hr swab $10^6$ cfu/ml | 0.01 | 0.46 | 0.07 | 0.08 | 0.07 |

TABLE 10

Growth Performance of Pigs

| Performance | Control | E-10 | E-12 | E-2 × 10 | E-2 × 12 |
|---|---|---|---|---|---|
| Phase 1 | | | | | |
| ADG 0-3, g/d | $-28.4^a$ | $-79.5^a$ | $-94.6^a$ | $-47.7^a$ | $-229.5^b$ |
| ADG 4-7, g/d | $143.8^b$ | $57.5^{ab}$ | $78.2^{ab}$ | $139.2^b$ | $7.6^a$ |
| ADG 0-7, g/d | $45.4^a$ | $-20.8^{ab}$ | $-20.6^{ab}$ | $32.4^{ab}$ | $-85.6^b$ |
| ADFI 0-7, g/d | $115.2^b$ | $81.7^a$ | $93.1^{ab}$ | $97.8^{ab}$ | $75.0^a$ |
| G/F wk1, kg/kg | $390^b$ | $-580^{ab}$ | $-350^{ab}$ | $320^b$ | $-1090^a$ |
| ADG wk2, g/d | 269.6 | 284.9 | 239.3 | 353.0 | 234.6 |
| ADFI wk2, g/d | $339.8^b$ | $316.4^{ab}$ | $277.4^{ab}$ | $270.4^{ab}$ | $244.2^b$ |
| G/F wk2, g/d | $790^a$ | $910^a$ | $960^a$ | $1320^b$ | $820^a$ |
| ADG wk12, g/d | $165.0^{ab}$ | $142.2^{ab}$ | $118.0^{ab}$ | $203.4^b$ | $110.0^a$ |
| Phase 2 | | | | | |
| ADG wk34, g/d | 539.0 | 389.1 | 428.1 | 455.8 | 356.2 |
| ADFI wk34, g/d | 524.4 | 494.7 | 497.7 | 546.9 | 509.0 |
| G/F wk34, g/kg | 1100 | 810 | 900 | 810 | 740 |
| ADG1-4, g/d | 338.6 | 256.8 | 270.8 | 310.1 | 224.3 |

[1]Values in each row with different letters indicate significant difference in means, P < 0.04.

TABLE 11

Growth performance: Body Weight changes during the study period

| Study period | Body weight kg ± SE in different groups | | | | |
|---|---|---|---|---|---|
| (Days) | Control | E. coli $10^{10}$ | $10^{12}$ | $2 \times 10^{10}$ | $2 \times 10^{12}$ |
| 0 | 6.06 ± 0.21 | 6.05 ± 0.15 | 6.06 ± 0.15 | 6.02 ± 0.16 | 6.01 ± 0.15 |
| 4 | 5.94 ± 0.20 | 5.69 ± 0.13 | 5.68 ± 0.25 | 5.75 ± 0.23 | 5.30 ± 0.30 |
| 7 | 6.37 ± 0.28 | 5.66 ± 0.31 | 5.91 ± 0.38 | 6.00 ± 0.32 | 5.90 ± 0.30 |
| 15 | 8.53 ± 0.51 | 8.24 ± 0.21 | 7.82 ± 0.46 | 8.19 ± 1.06 | 7.77 ± 0.51 |
| 28 | 15.53 ± 1.03 | 13.29 ± 1.17 | 12.96 ± 1.20 | 15.46 ± 1.50 | 12.40 ± 0.12 |

TABLE 12

Percentage body weight changes before and after feeding with diet supplemented with 0.4% avian antibodies

| Study period | Groups | | | | |
|---|---|---|---|---|---|
| (Days) | Control | E. coli $10^{10}$ | $10^{12}$ | $2 \times 10^{10}$ | $2 \times 10^{12}$ |
| 0-4 | −1.98 | −5.95 | −6.27 | −4.49 | −11.81 |
| 5-7 | 7.24 | −0.53 | 4.05 | 4.35 | 11.32 |
| 8-14 | 33.91 | 45.58 | 32.32 | 36.5 | 31.69 |
| 15-28 | 82.06 | 61.29 | 65.73 | 88.77 | 59.59 |

TABLE 13

Treatment Schedule

| Treatment Groups | # of Pigs | Abr. Name | Diets for Phase 1 & 2 |
|---|---|---|---|
| 1 | 6 | EG | Basal + 0.4% control egg powder |
| 2 | 6 | ABEG 2% | Basal + 0.2% antibody egg powder |
| 3 | 6 | ABEG 4% | Basal + 0.4% antibody egg powder |
| 4 | 6 | ABDex 2% | Basal + 0.2% Eggstend (0.2% antibody egg powder-dextrose at 1:1) |
| 5 | 6 | ABDex 4% | Basal + 0.4% Eggstend (0.4% antibody egg powder-dextrose at 1:1) |

TABLE 14

Clinical response after prophylactic treatment of piglets with control or antibody egg powder following challenge with $10^{12}$ CFU doses of ETEC K-88

| Groups | Number of animals with diarrhea | No. pigs with diarrhea (fecal score) with time (hours) post-infection) | | | | | |
|---|---|---|---|---|---|---|---|
| | | 6 | 24 | 48 | 72 | 96 | 120 |
| Control Egg powder EG | 5/6 | 2(3.75)* | 4(2.5) | 4(2.5) | 3(2.5) | 2(2.5) | 2(2.0) |
| ABEG 2% | 4/6 | 2(3.0) | 3(1.5)* | 3(2.0) | 2(1.5) | 2(1.5)* | 1(1.0) |
| ABEG 4% | 2/6 | 2(1.7) | 2(2.0) | 2(2.0) | 2(1.5) | 2(1.5) | 2(1.0) |
| ABDEX 2% | 4/6 | 3(1.7)* | 4(2.0) | 3(2.0) | 3(2.0) | 3(1.7)* | 3(1.0) |
| ABDEX 4% | 2/6 | 1(2.0) | 2(2.0) | 2(2.0) | 2(2.0) | 2(2.0) | 1(2.0)* |

Fecal scores were recorded as 0 = normal, 1 = light, 2 = medium, and 3 = severe, to indicate diarrhea severity. 2(3.0) indicates 2 pig had diarrhea with an average score of 3.0.
*indicates that one piglet was dead at each time point.

TABLE 15

Enumeration of ETEC in Rectal Swabs

| | Control-EG | ABEG 2% | ABEG 4% | ABDEX 2% | ABDEX 4% |
|---|---|---|---|---|---|
| $1^{st}$ Pre swab, ×$10^6$ cfu/swab | 0.03 | 0.02 | 0.02 | 0.06 | 0.02 |
| 6 hr swab, ×$10^6$ cfu/swab | 0.02 | 0.02 | 0.05 | 0.03 | 0.03 |
| 24 hr swab, $10^6$ cfu/swab | 6.43 | 2.35 | 1.02 | 0.61 | 0.12 |
| 48 hr swab $10^6$ cfu/swab | 29.66 | 1.29 | 0.68 | 2.13 | 0.16 |
| 96 hr swab $10^6$ cfu/swab | 0.18 | 0.07 | 0.03 | 0.24 | 0.16 |
| 120 hr swab $10^6$ cfu/swab | 1.6 | 0.4 | 0.3 | 1.8 | 0.2 |

TABLE 16

Growth performance based on Body Weight Increase

Body weight kg ± SE in different groups

| Study period | EG 4% (control egg powder 0.4%) | ABEG 2% (0.2% Ab Egg powder) | ABEG 4% (0.4% Ab Egg powder) | *ABDEX 2% (Eggstend 0.2%) | ABDEX 4% (Eggstend 0.4%) |
|---|---|---|---|---|---|
| 0 | 5.89 ± 0.18 | 5.96 ± 0.16 | 5.95 ± 0.15 | 5.97 ± 0.14 | 5.96 ± 0.12 |
| 7 | 7.01 ± 0.13 | 6.84 ± 0.20 | 7.22 ± 0.18 | 6.97 ± 0.15 | 7.11 ± 0.19 |
| 10 | 7.10 ± 0.22 | 7.12 ± 0.39 | 7.65 ± 0.25 | 6.78 ± 0.44 | 7.69 ± 0.33 |
| 14 | 8.01 ± 0.25 | 8.61 ± 0.50 | 9.27 ± 0.60 | 7.83 ± 0.95 | 9.41 ± 0.23 |
| 28 | 12.89 ± 0.90 | 14.59 ± 0.69 | 14.65 ± 1.88 | 13.14 ± 1.03 | 15.45 ± 1.35 |

TABLE 17

Growth Performance based on ADG, ADFI and G/F

| Performance* | EG | ABEG2% | ABEG4% | ABDex2% | ABDex4% | P value |
|---|---|---|---|---|---|---|
| Phase 1 | | | | | | |
| Wt day 0, kg | 5.88 | 5.96 | 5.95 | 5.97 | 5.96 | 0.9093 |
| Wt day 7, kg | 7.01 | 7.06 | 7.22 | 6.98 | 7.11 | 0.9238 |
| ADG 0-7, g/d | 126 | 121.9 | 141.1 | 97.5 | 127.4 | 0.8274 |
| Wt day 10, kg | 7.1 | 7.24 | 7.65 | 6.98 | 7.69 | 0.3626 |
| Wt day 14, kg | $8.01^a$ | $8.61^{ab}$ | $9.27^b$ | $7.83^a$ | $9.41^b$ | 0.1410 |
| ADG 7-10, g/d | 68 | 149.5 | 216 | 157.8 | 286.6 | 0.7221 |
| ADG 11-14, g/d | 226.8 | 296 | 405 | 174.5 | 356.4 | 0.3474 |
| ADG wk2, g/d | $173.9^b$ | $278.3^{ab}$ | $342^{ab}$ | $186.9^{ab}$ | $375.5^b$ | 0.2499 |
| ADG wk12, g/d | 141.5 | 190 | 221.4 | 104.4 | 225.5 | 0.2331 |
| ADFI wk12, g/d | $232.2^{bc}$ | $194.6^a$ | $273.5^c$ | $157.3^a$ | $252^c$ | 0.0002 |
| G/F wk12, g/d | 600 | 918 | 810 | 627 | 888 | 0.4017 |
| Phase 2 | | | | | | |
| Wt day 14, kg | $8.01^a$ | $8.61^{ab}$ | $9.27^b$ | $7.83^a$ | $9.41^b$ | 0.1410 |
| Wt day 28, kg | 12.88 | 14.59 | 14.66 | 13.13 | 15.45 | 0.7203 |
| ADG wk34, g/d | 374.7 | 460.1 | 414.1 | 408.4 | 464.7 | 0.9494 |
| ADFI wk34, g/d | $568.1^a$ | $701.9^{ab}$ | $642.6^a$ | $535.4^a$ | $814.8^b$ | 0.0242 |
| G/F wk34, kg/kg | 630 | 686 | 609 | 722 | 573 | 0.9450 |
| ADG1-4, g/d | 249.8 | 315.4 | 310.9 | 245.5 | 336.4 | 0.7481 |

*Values in each row with different letters indicate difference in means, P < .05

The invention claimed is:

1. A method of increasing growth performance in a piglet comprising:
   immunizing a population of hens with K88 bacterial antigen;
   collecting eggs from the population of hens, said eggs containing antibodies raised against said K88 bacterial antigen;
   recovering antibody-containing material from said eggs;
   drying said antibody-containing material to a powder, thereby producing dried egg powder;
   confirming that the titer of the K88 antibodies is at least 1/256,000 compared to a control titer from eggs from a non-immunized hen of 1/1600;
   supplementing feed of a piglet with 0.1-1.0% (w/w) of the dried egg powder; and
   feeding said feed to said piglet ad libitum, wherein said piglet has increased growth compared to a control piglet of similar age and condition, fed a similar feed ration ad libitum and regimen but said similar feed ration being without supplementation with said antibody-containing egg powder.

2. The method according to claim 1 wherein growth performance is increased by improving nutrient absorption and uptake.

3. The method according to claim 1 wherein growth performance is increased by reducing gut inflammation.

4. The method according to claim 1 wherein growth performance is increased by increasing average daily weight gain.

5. The method according to claim 1 wherein growth performance is increased by at least 9.2% after 14 days.

6. The method according to claim 1 wherein increased growth performance is an increase in average daily weight gain of at least 10%.

* * * * *

UNITED STATES PATENT AND TRADEMARK OFFICE
CERTIFICATE OF CORRECTION

PATENT NO. : 7,713,527 B2  Page 1 of 1
APPLICATION NO. : 11/532696
DATED : May 11, 2010
INVENTOR(S) : Pradip Maiti and John Hare It is certified that error appears in the above-identified patent and that said Letters Patent is hereby corrected as shown below:

On the Title Page, Item (76) should read,

(76) Inventors: Pradip Maiti, 6-62 Scurfield Blvd., Winnipeg Manitoba (CA) R3Y 1M5;
John Hare, 6-62 Scurfield Blvd., Winnipeg Manitoba (CA) R3Y 1M5

Signed and Sealed this

Sixth Day of July, 2010

David J. Kappos
*Director of the United States Patent and Trademark Office*